April 2, 1946.  H. C. FORD  2,397,784
APPARATUS FOR DETERMINING BALLISTIC FACTORS
Filed July 21, 1928
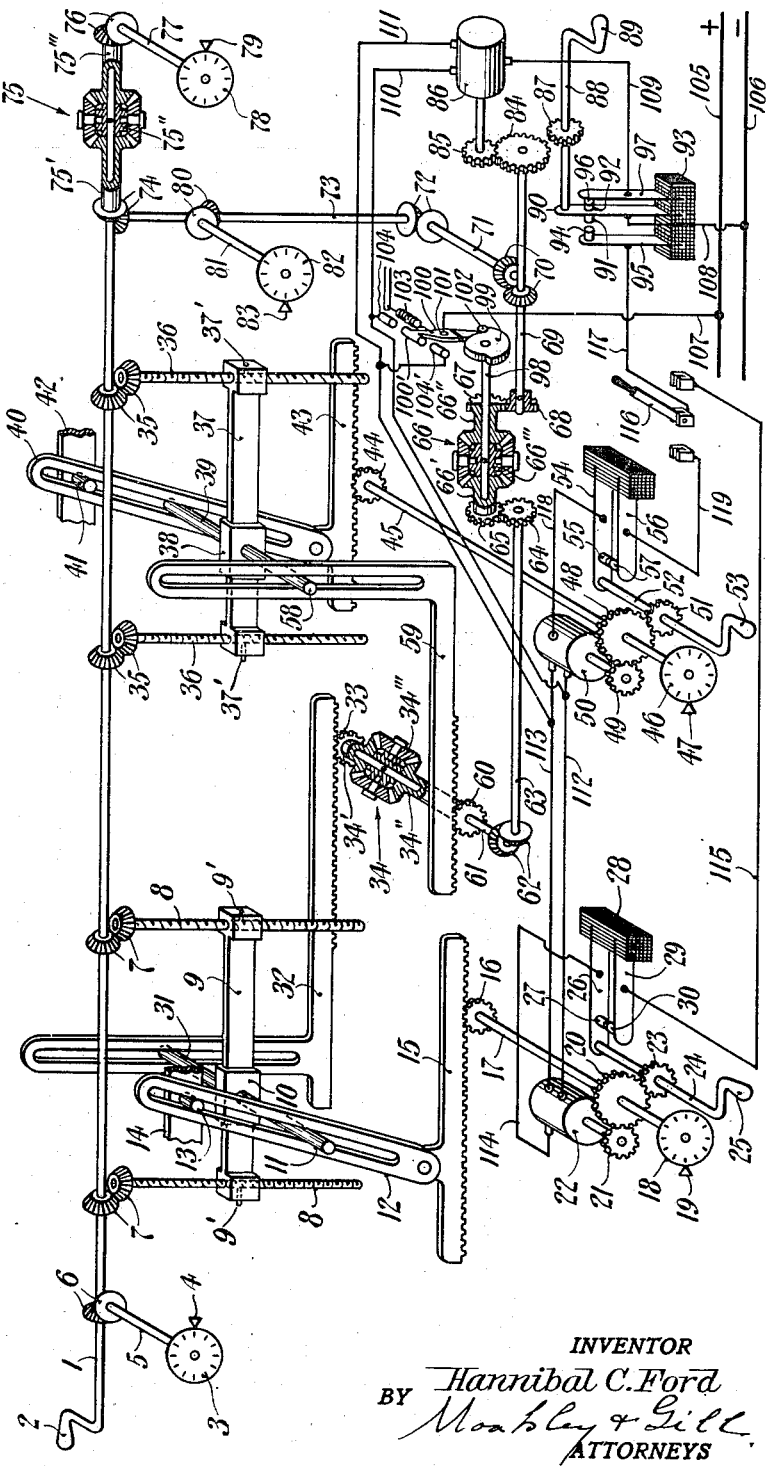
INVENTOR
Hannibal C. Ford
BY Mosbley & Gill
ATTORNEYS Patented Apr. 2, 1946

2,397,784

UNITED STATES PATENT OFFICE 2,397,784

APPARATUS FOR DETERMINING BALLISTIC FACTORS

Hannibal C. Ford, Jamaica, N. Y., assignor to Ford Instrument Company, Inc., Long Island City, N. Y., a corporation of New York Application July 21, 1928, Serial No. 294,497

12 Claims. (Cl. 235—61.5)

This invention relates to an apparatus for determining the values of ballistic factors involved in the firing of ordnance.

More specifically the invention provides an apparatus using the method of determining the value of a ballistic factor affecting the trajectory of a projectile fired in accordance with a point of aim which consists in calculating the firing data for the point of aim and an estimated value of the ballistic factor, firing a projectile in accordance with the firing data, observing the difference between the point of impact of the projectile and the point of aim and determining the actual value of the ballistic factor by altering it until the calculated firing data is altered by the amount of the observed difference.

One form of apparatus which may be employed consists of an instrument for computing the corrections due to ballistic factors, such as the initial velocity of a projectile and the effect of wind upon a projectile and which includes mechanism whereby the values of the ballistic factors set up in the instrument may be corrected as a result of observations of the errors in the firing of the ordnance due to errors in the values of the factors as originally set up in the instrument.

The particular nature of the invention as well as other objects and advantages thereof will appear more clearly from a description of a preferred embodiment as shown in the accompanying drawing in which:

Fig. 1 is a diagrammatic view of the instrument, and

Fig. 2 is a ballistic diagram used in connection with the explanation of the operation of the instrument.

Referring to Fig. 1, I represents a shaft provided with a crank 2 by which the range of the point of aim of the guns with which the instrument is to be used may be set into the instrument, the value of the range being shown by a dial 3 reading against an index 4 and carried on a shaft 5 connected through bevel gears 6 to the shaft I.

The shaft I is also connected by two pairs of bevel gears 7 with two screws 8 of varying pitch passing through the ends of a range bar 9 extending between the screws and provided with pins 9' extending into their threads. The bar 9 carries a slidable carriage 10 from the front side of which a pin 11 projects through a slot in an arm 12 which at its upper end is slidably mounted on a pin 13 projecting from a fixed frame member 14. The lower end of the arm 12 is pivoted to a horizontal rack 15 meshing with a pinion 16 on one end of a shaft 17, the other end of which carries an initial velocity dial 18 readable against an index 19. The shaft 17 also carries a gear 20 meshing with a pinion 21 on the shaft of a motor 22, the circuits and function of which will hereinafter be described. The gear 20 also meshes with a pinion 23 on a longitudinally movable shaft 24 provided with a crank 25 at its outer end. The inner end of the shaft is rotatably mounted in the free end of a switch spring 26 provided with a contact element 27 and mounted within a block of insulation 28. A second switch spring 29 carries a coacting contact element 30 and is also mounted in the block 28.

Extending rearwardly from the carriage 10 in alignment with the pin 11 is a pin 31 extending through the slotted vertical arm of a rectangular initial velocity slide 32 the horizontal arm of which is provided with a rack meshing with a pinion 33 attached to one side 34' of a differential 34, the remaining elements of which will be hereinafter described.

The shaft I is also provided with two pairs of bevel gears 35 for driving screws 36 of varying pitch which pass through the ends of a range bar 37 having pins 37' extending into the threads of the screws. The bar carries a slidable carriage 38 having a rearwardly projecting pin 39 which passes through a slot in an arm 40 which is slidably mounted at its upper end upon a pin 41 projecting from a fixed frame 42. The lower end of the arm is pivotally connected to a horizontal rack 43 which meshes with a pinion 44 on one end of a shaft 45 which carries on its other end a dial 46 readable against an index 47 for showing the wind component along the line of sight to a target. The shaft also carries a gear 48 meshing with a pinion 49 on the shaft of a motor 50, the circuits and function of which will be hereinafter described.

The gear 48 also meshes with a pinion 51 on a longitudinally movable shaft 52 provided at its outer end with a crank 53. The other end of the shaft is rotatably connected to a switch spring 54 provided with a contact element 55 and mounted in a block of insulation. A second switch spring 55 carries a coacting contact element 57 and is also mounted in the block.

The carriage 38 is provided with a pin 58 extending forwardly and in alignment with the pin 39 through the slotted vertical arm of a rectangular wind component slide 59, the horizontal arm of which is provided with a rack engaging a pinion 60 attached to the second side 34'' of the differential 34. The center 34'''' of the differential is attached to a shaft 61 connected by bevel gears 62 to a shaft 63 which carries a gear 64 meshing with a gear 65 attached to one side 66' of a differential 66. The other side 66'' of the differential carries a gear 67 meshing with a pinion 68 on the end of a shaft 69 which is connected through bevel gears 70, shaft 71, bevel gears 72, shaft 73 and bevel gears 74 to the side 75' of a differential 75, the center 75'' of which is attached to the right hand end of shaft 1. The second side 75''' of this differential is connected by bevel gears 76 to a shaft 77 carrying a dial 78 readable against an index 79 to show the firing range, that is, the range corrected for initial velocity and wind component as will hereinafter be explained in detail. The shaft 73 also drives through bevel gears 80 and shaft 81, a dial 82 readable against an index 83 to show the value of the corrections applied to the range to give the firing range shown by the dial 78.

The shaft 69 also carries a gear 84 meshing with a gear 85 on the shaft of a motor 86 the circuits of which will be hereinafter described. Adapted to coact with gear 84 under certain conditions is a pinion 87 on a shaft 88 provided with a crank 89. The other end of this shaft is rotatably mounted in a switch spring 90 provided with contact elements 91 and 92 and mounted in a block of insulation 93. The contact element 91 coacts with a similar element 94 at the end of a switch spring 95 mounted in the block 93. The contact element 92 coacts with a similar element 96 at the end of a switch spring 97 also mounted in the block 93.

The center 66''' of the differential 66 is attached to a shaft 98 which carries on its other end a cam 99 formed with two dwells of unequal radii connected by sloping portions. A lever 100 pivoted at 101 carries at its lower end a roller 102 held against the cam by a spring 103, the normal relation of the parts being such that the roller engages an intermediate point of one of the sloping portions of the cam so that when the cam turns in one direction the roller is moved inwardly against the dwell of lesser radius by the tension of the spring, while if the cam turns in the opposite direction the roller is moved outwardly against the tension of the spring into engagement with the dwell of greater radius. The upper portion of the lever is insulated from the lower portion and is formed at its outer end as a contact 100' lying between a pair of contacts 104 and 104'.

The electrical elements of the apparatus are energized as will hereinafter be described from supply mains 105 and 106 through the following circuit connections. A conductor 107 is connected between the main 105 and the upper portion of the arm 100. The main 106 is connected by a conductor 108 to the switch spring 90. The switch spring 97 is connected by a conductor 109 to the motor 86. For the sake of simplicity the motor is shown diagrammatically, it being understood that it comprises an armature to which the conductor 109 is connected and a pair of reversely wound field windings connected to conductors 110 and 111. These conductors are connected respectively to contacts 104 and 104' and also to conductors 112 and 113, respectively, connected to the oppositely wound field windings of the motors 22 and 50 which will be understood to be of the same type as motor 86. The armature of motor 22 is connected by conductor 114 to switch spring 26. The coacting switch spring 29 is connected by conductor 115 to a contact element with which the blade 116 of a double-throw switch is adapted to coact, this blade being connected by conductor 117 to switch spring 95. The armature of motor 50 is connected by conductor 118 to the switch spring 54 and the coacting switch spring 56 is connected by conductor 119 to the other contact element for the switch blade 116.

In the initial operation of the apparatus the parts may be regarded as occupying the positions illustrated. The range of the target as determined by a suitable instrument is applied by rotating the handle 2 and shaft 1 until the proper value is indicated by the dial 3. The movement of the shaft 1 produces a displacement of the range bar 9 through bevel gears 7 and screws 8 and of the range bar 37 through bevel gears 35 and screws 36. It is intended that the parts shall be so arranged that for normal initial velocity of the projectile the arm 12 will occupy a vertical position and the same is true of the arm 40 for zero value of the wind component along the line of sight.

If the initial velocity differs from its normal value the crank 25 will be manipulated to turn the shaft 24 and through pinion 23 and gear 20 drive the shaft 17 until the desired value as shown by the dial 18 is set up. Through pinion 16 there will be a corresponding movement of rack 15 and arm 12 to displace through the pin 11 the carriage 10 on the range bar 9. The pin 31 will thus be displaced in accordance with the amount by which the difference in initial velocity affects the range. The screws 8 are of variable pitch to take care of the variable function of initial velocity with respect to range. The resulting displacement of the pin 31 will move the slide 32 and the side 34' of the differential 34 through pinion 33. In other words, this side of the differential will be displaced in accordance with the initial velocity correction for the given range of the target.

In a similar manner the correction required for the estimated wind component along the line of sight is introduced by manipulation of the crank 53 to turn the shaft 52 and through pinion 51 and gear 48 rotate the shaft 45 until the required value has been set up as shown by the dial 46. Through pinion 44, the rack 43 and arm 40 will be correspondingly displaced to alter through the pin 39 the position of the carriage 38 on the range bar 37. The screws 36 are of variable pitch to take care of the variable function of the wind component with respect to range. The pin 58 is thus displaced in accordance with the estimated effect of the wind component on the range of the target. The slide 59 is thus correspondingly displaced as is also the side 34'' of differential 34 by pinion 60.

The center 34'''' of the differential is thus displaced in accordance with the combined initial velocity and wind corrections for the range of the target. Through shaft 61, bevel gears 62, shaft 63 and gears 64 and 65 the side 66' of differential 66 is correspondingly displaced. Regarding for the time being the side 66'' as fixed the center 66''' will be turned and through the shaft 98 turn the cam 99 in one direction or the other to shift the contact 100' into engagement with contact 104 or contact 104' according to whether the lower end of the lever 100 moves inwardly or outwardly from its normal position with respect to the cam.

A circuit will thus be established from the main 105 through conductor 107, lever 100, contact 100', one or the other of the contacts 104 or 104' and conductors 110 or 111, the corresponding field winding of the motor 86, the conductor 109, switch spring 97, contact elements 96 and 92, switch spring 90 and conductor 108 to the other main 106. The energization of the motor will through gears 85 and 84, shaft 69, pinion 68 and gear 67 drive the side 66'' of the differential 66. Regarding the other side 66' as fixed the center 66''' will be turned in the opposite direction to which it had been previously turned to break the circuit of the motor 86 by restoring the lever 100 to its normal position with its roller 102 engaging the sloping portion of the cam 99. The elements thus described constitute a follow-up system by which the shaft 69 is driven in accordance with the movement imparted to shaft 63, but with increased power furnished by the motor 86.

The movement of shaft 69 is transmitted through bevel gears 70, shaft 71 and bevel gears 72 to the shaft 73. Through bevel gears 80 and shaft 81, the dial 82 is turned to show the correction applied to the range to give the firing range. At the same time the side 75' of the differential 75 is driven from the shaft 73 through bevel gears 74 and since the center 75'' of this differential is driven by the shaft 1 the second side 75''' will be turned in accordance with the algebraic sum of range and the corrections therefor, so that through bevel gears 76 and shaft 77, the dial 78 will be turned to show the value of the firing range for the estimated corrections for initial velocity and wind component along the line of sight.

The gun will then be fired in accordance with the indicated range and its projectile will have a trajectory represented by the broken line A of Fig. 2 with a point of impact B, it being understood that the term "point of impact" as used herein includes the point of burst of time fuse projectiles, such as are used against air craft. If the initial velocity and wind component corrections have been correctly evaluated one of these quantities being known and the other being estimated, the point of impact will be at the required point of aim, but in practice there will usually be errors in the estimates of either or both of these quantities so that the actual trajectory A differs from the desired trajectory C with a difference between the point of impact B and the desired point of aim D. As stated above, this difference may be due to an error in the estimated initial velocity of the gun or to an error in the estimated wind component along the line of sight or to a combination of errors in both quantities. Since the actual value of the initial velocity can usually be accurately estimated and an error in the estimated wind component is more probable the manner in which corrections are applied to the apparatus will be described in connection with the wind component elements, it being understood that a similar operation may be performed in connection with the initial velocity elements and also in connection with both of these sets of elements. It is to be understood that when the corrections are to be applied to the initial velocity elements the actual value of the wind component must be known. The actual value of the wind component can usually be obtained from other guns which are firing at the same target. Also, when the corrections are to be applied to the wind component elements the actual value of the initial velocity must be known. Ordinarily, this is obtainable from standard range data which give the initial velocity for guns and modified, if necessary, for known gun erosion, for example.

To put the apparatus in condition to be corrected the crank 53 and shaft 52 are moved forwardly to disengage the pinion 51 from gear 48 and permit the contact elements 55 and 57 carried by the switch springs 54 and 56 respectively to come into engagement. The switch blade 116 is thrown to its left hand position to connect conductors 117 and 119. The crank 89 and shaft 88 are moved inwardly to engage the pinion 87 with gear 84 and also to separate the contact elements 92 and 96 by the movement of switch spring 90 to break the circuit of motor 86. At the same time contact elements 91 and 94 are brought into engagement to connect the conductors 108 and 117 through the switch springs 90 and 95.

The crank 89 is then manipulated in accordance with the estimated corrections required to compensate for the error in the trajectory of the projectiles due to the error in the initial estimate of the wind component along the line of sight. The rotation imparted to the shaft 88 will be transmitted through pinion 87 and gear 84 to shaft 69 and from the latter through bevel gears 70, shaft 71, bevel gears 72, shaft 73, bevel gears 80 and shaft 81 to the dial 82 to show when the estimated correction has been properly set up in the instrument. At the same time the shaft 69 will through pinion 68 and gear 67 turn the side 66'' of differential 66. Regarding its other side 66' as fixed the center will be turned to displace the cam 99 through shaft 88 in one direction or the other to establish a circuit from the main 105 through conductor 107, lever 100, contact 100', one or the other of the contacts 104 or 104', one or the other of the conductors 110 or 111, the corresponding field winding of the motor 50, conductor 118, switch spring 54, contact elements 55 and 57, switch spring 56, conductor 119, switch blade 116, conductor 117, switch spring 95, contact elements 94 and 91, switch spring 90 and conductor 108 to the other main 106.

The energization of motor 50 causes through pinion 49, gear 48, shaft 45 and pinion 44 a correctional movement of the wind component rack 43. There will, therefore, be a corresponding displacement of the pin 58 and slide 59 which will be imparted to the side 34'' of differential 34 through pinion 60. Regarding the other side 34' as fixed since it is connected to the initial velocity correction slide 32 which is not being operated, the center 34''' will be turned and its movement will be transmitted by shaft 61, bevel gears 62, shaft 63 and gears 64 and 65 to the side 66' of differential 66. Regarding the other side 66'' as now fixed the center 66''' will be turned in a direction to restore the cam 99 and lever 100 to their normal relation with the roller 102 upon one of the sloping portions of the cam thereby breaking the circuit of motor 50.

The correctional displacement of the shaft 73 produced by manipulation of the crank 89 will also be transmitted through bevel gears 74 to the side 75' of the differential 75 and regarding its center 75'' as fixed the second side 75''' will be turned to produce a corresponding correctional displacement of the firing range dial 78.

As a result of the correctional operations described above the wind component slide 59 will be displaced in accordance with the required correction so that when the parts are restored to the condition shown in Fig. 1 this wind correction will be automatically and continuously applied to the range to indicate the correct firing range for changing values of range set up by operation of crank 2.

In practice the instrument will be so manipulated as to bring the point of impact B to the point of aim D by a series of correcting operations as described above. When such a condition exists the indications of the dial 46 will show the actual wind component along the line of sight, this value being subject to corrections from time to time due to changes in wind.

As stated above when the actual value of the wind is known a correction for a difference between the estimated and actual initial velocities may be applied as described above in connection with wind, with the difference that the switch blade 116 is shifted to its right hand position and the crank 25 is moved forwardly to disengage the pinion 23 from gear 20 and partially establish the circuit of motor 22 through conductor 114, switch spring 26, contact elements 27 and 30, switch spring 29 and conductor 115 to the switch blade 116 from which the circuit continues to the main 106 over the elements previously described. The motor 22 is then controlled by the actuation of the cam 99 from differential 66 to produce a correctional displacement of the initial velocity slide 32 to maintain the parts of the instrument in corrected condition when restored to their normal condition. As in the case of the wind component, the correct value of the initial velocity will be indicated by dial 18 after the correcting operations have been performed.

While the apparatus has been shown in connection with a wind component along the line of sight it will be understood that a similar apparatus may be used for determining the corrections due to a wind component perpendicular to the line of sight.

In the operation of the apparatus as described above, the initial velocity motor 22 and/or the wind component motor 50 have been employed for applying correctional displacements to the slides 32 and 59 respectively under the control of the crank 89. It is possible, however, to perform this correcting operation by the cranks 25 and 53 and without using the corresponding motors. Considering that the wind component crank 53 is to be employed, the parts will be retained in their normal condition as shown in Fig. 1 with the pinion 51 in mesh with the gear 48 and the circuit of motor 50 open at the contact elements 55 and 57, the switch blade 116 also being in open circuit position. Under these conditions the required wind component correction may be applied by operation of the crank 53 in the same way that the estimated wind component correction was initially applied before commencing the firing which showed that the actual trajectory differed from the desired one as explained in connection with Fig. 2.

The present correctional displacement of the shaft 45 is transmitted by pinion 44, rack 43, arm 40 and pins 39 and 58 to slide 59 and then through pinion 60 to the differential 34. The latter then works through the shaft 61, bevel gears 62, shaft 63 and gears 64 and 65 to the differential 66 by which the cam 99 is actuated to control the motor 86, as previously described, to show by dial 82 the value of the correction being applied and by dial 78 the corrected value of the firing range. As in the operation of the instrument when the motor 50 is employed, the correct value of the wind component will be shown by dial 46 when the point of impact B is as near the point of aim D as is required for the desired accuracy of fire.

It will be understood that in a similar manner corrections for errors in the estimated initial velocity may be applied by manipulation of the crank 25 in the same manner as described in connection with crank 53.

It will also be understood that while the instrument has been shown for computing corrections for certain ballistic factors it may be used for other factors and that various changes may be made in its structural details without departing from the principal of the invention as defined in the appended claims.

I claim:

1. In apparatus for determining the value of a ballistic factor affecting the trajectory of a projectile fired in accordance with a point of aim representing a future position of a target, the combination of a calculating mechanism having settable elements, setting means for different elements, said mechanism and means being operable to calculate the firing data for the point of aim and an estimated value of the ballistic factor, effective in the plane of firing, and correctional means operable to actuate said mechanism and setting means to alter the ballistic factor until the calculated firing data is altered by the amount of the observed distance in the firing plane between the point of aim and the point of impact of a projectile fired in accordance with the calculated firing data.

2. In apparatus for determining the value of a ballistic factor affecting the trajectory of a projectile fired in accordance with a range to a future position of a target, the combination of calculating mechanism comprising elements displaceable in accordance with the firing range, means adjustable by said elements and settable in accordance with the ballistic factor, said mechanism and means being operable to calculate the firing data for the range and an estimated value of the ballistic factor, and a control for said settable means operable to actuate the same and the mechanism to alter the ballistic factor until the firing data is altered by the amount of the observed difference between the point of aim for the range and the point of impact of a projectile fired in accordance with the calculated firing data.

3. In apparatus for determining the value of a wind component factor affecting the trajectory of a projectile fired in accordance with a point of aim representing a future position of a target, the combination of mechanism for calculating the firing data for the point of aim and an estimated value of the wind component factor effective in the plane of firing, said mechanism including a part settable in accordance with an estimated value of the wind component, means for arbitrarily setting said part, and correctional means operable to replace the arbitrary control of said part to alter the wind component factor until the calculated firing data is altered by the amount of the observed difference between the point of aim and the point of impact of a projectile fired in accordance with the calculated firing data.

4. In apparatus for determining the value of an initial velocity factor affecting the trajectory of a projectile fired in accordance with a point of aim representing a future position of a target, the combination of mechanism for calculating the firing data for the point of aim and an estimated value of the initial velocity factor, said mechanism including an element settable in accordance with the firing range, a part arbitrarily settable in accordance with the estimated value of an initial velocity factor, result establishing means combined with and responsive to said element and part, and correctional means operable to replace the arbitrary control of said part to alter the initial velocity factor and actuate said part and the first named means until the calculated firing data is altered by the amount of the observed difference between the point of aim and the point of impact of a projectile fired in accordance with the calculated firing data.

5. In a computing instrument, the combination of a member adapted to be actuated in accordance with a factor of a point of aim representing a future position of a target, a second member adapted to be actuated in accordance with an estimated value of a ballistic factor related to the substantial plane of and affecting the trajectory of a projectile fired in accordance with the first factor, an element actuated by the combined actuations of the members for giving the data for firing the projectile, means for correcting the actuation of the second member in accordance with observed difference as related to said plane between the point of impact of a projectile fired in accordance with said data and the point of aim, and means for indicating the value of the second ballistic factor required for such corrections.

6. In a computing instrument the combination of a member adapted to be actuated in accordance with a factor of a point of aim, a second member adapted to be actuated in accordance with an estimated value of a ballistic factor affecting the trajectory of a projectile fired in accordance with the first factor, means for combining the actuation of the members, a part actuated in response to the operation of the combining means to give the correction required to the effect of the first factor, means actuated by the first member and the part for giving the data required for firing the projectile, means for altering the last named means in accordance with the observed difference between the point of aim and the point of impact of a projectile fired in accordance with the firing data, and means for simultaneously actuating the second member to cause the combined actuation of the members to actuate the part an amount corresponding to the correction to the firing data.

7. In a computing instrument the combination of a member adapted to be actuated in accordance with the range of a point of aim, a second member, arbitrary setting means therefor adapted to be operated to actuate said second member in accordance with an estimated value of a ballistic factor affecting the trajectory of a projectile fired at that range, said arbitrary setting means being adapted to be engaged with and disengaged from said second member, separate means for indicating the movement of the members, means for combining the actuations of the members to give the estimated correction, means for combining the movements of the first member and the combining means to give the firing range, and means substitutional for said arbitrary setting means and operable to correct the actuation of the second member in accordance with the observed differences between the point of aim and the point of impact of a projectile fired in accordance with the firing range whereby the correct value of the ballistic factor will be shown by the indicating means for the second member.

8. In a computing instrument, the combination of a member adapted to be actuated in accordance with a factor of a point of aim, a second member adapted to be actuated in accordance with an estimated value of a ballistic factor affecting the trajectory of a projectile fired in accordance with the first factor, separate means for indicating the movements of the members, means for combining the actuations of the members, means under the control of the combining means for indicating the combined actuations of the members and means for combining the combined actuations and the movement of the first member to give the data for firing the projectile and means for correcting the actuation of the second member in accordance with observed differences between the point of aim and the point of impact of a projectile fired in accordance with such data whereby the correct value of the ballistic factor will be shown by the indicating means for the second member.

9. In a computing instrument, the combination of a member adapted to be actuated in accordance with a factor of a point of aim, a second member adapted to be actuated in accordance with an estimated value of a ballistic factor affecting the trajectory of a projectile fired in accordance with the first factor, separate means for indicating the movements of the members, means for combining the actuations of the members, means for indicating the combined actuations of the members, a power driven follow-up mechanism including controlling elements under the control of the combining means for actuating the last named indicating means and means for combining the movement of the means for indicating the combined actuations of the members with the movement of the first member to give the data for firing the projectile and means including the controlling elements of the follow-up mechanism for correcting the actuation of the second member in accordance with observed differences between the point of aim and the point of impact of a projectile fired in accordance with such data applied to the means for indicating the combined actuations of the members, whereby the correct value of the ballistic factor will be shown by the indicating means for the second member.

10. In a computing instrument, the combination of a member adapted to be actuated in accordance with a factor of a point of aim, a second member adapted to be actuated in accordance with the actual value of a ballistic factor affecting the trajectory of a projectile fired in accordance with the first factor, a third member adapted to be actuated in accordance with an estimated value of a second ballistic factor affecting the trajectory of a projectile fired in accordance with the first factor, means for combining the actuations of the first and second members, means for combining the actuations of the first and third members, an element actuated in response to the operation of the first member and both of the combining means for giving the data for firing the projectile and means for correcting the actuation of the third member in accordance with observed differences between the point of aim and the point of impact of a projectile fired in accordance with the firing data whereby the correct value of the corresponding ballistic factor will be represented by the resulting actuation of the second or third members.

11. In a computing instrument, a part representing a factor, means for manually actuating the part, means for mechanically actuating the part, an element representing a function of the factor, a second element representing a function of the factor, a device actuated jointly by the elements, means for manually actuating the second element, means for mechanically actuating the second element, means including the device to cause the second element to be actuated mechanically when the part is actuated manually and reversely to cause the part to be actuated mechanically when the second element is actuated manually such that the functions represented by the elements are the same.

12. An apparatus for determining values of ballistic factors deriving from a wind vector and an initial velocity, the combination of calculating mechanism comprising elements displaceable in accordance with the firing range, means adjustable by said elements and settable in accordance with the respective ballistic factors, and said mechanism being operable to calculate firing data for range and an estimated value of at least one ballistic factor, and control means operable to actuate the same and to alter the ballistic factors until the firing data are altered by the amount of the observed difference between the point of aim and the point of impact of a projectile fired in accordance with the calculated firing data.

HANNIBAL C. FORD.